(12) United States Patent
Kearns et al.

(10) Patent No.: US 7,747,769 B1
(45) Date of Patent: Jun. 29, 2010

(54) METHOD AND APPARATUS FOR EFFICIENTLY SEARCHING AND SELECTING PREFERRED CONTENT FROM A PLURALITY OF ACTIVE MULTIMEDIA STREAMS

(76) Inventors: James L. Kearns, 4730 E. Indian School Rd., Ste 120-266, Phoenix, AZ (US) 85018; David W Dannenberg, 4730 E. Indian School Rd., Ste 120-266, Phoenix, AZ (US) 85018; Brian D. Kearns, 4730 E. Indian School Rd., Ste 120-266, Phoenix, AZ (US) 85018

( * ) Notice: Subject to any disclaimer, the term of this patent is extended or adjusted under 35 U.S.C. 154(b) by 688 days.

(21) Appl. No.: 11/642,812

(22) Filed: Dec. 20, 2006

Related U.S. Application Data

(60) Provisional application No. 60/753,021, filed on Dec. 22, 2005.

(51) Int. Cl.
  *G06F 15/16* (2006.01)
  *G06F 17/00* (2006.01)
(52) U.S. Cl. .................. 709/231; 709/219; 715/203
(58) Field of Classification Search ................ 715/203; 709/219, 223, 226, 231
See application file for complete search history.

(56) References Cited

U.S. PATENT DOCUMENTS

| | | | |
|---|---|---|---|
| 6,128,653 A * | 10/2000 | del Val et al. ............... | 709/219 |
| 7,099,952 B2 | 8/2006 | Wong | |
| 2002/0184195 A1 | 12/2002 | Qian | |
| 2004/0167890 A1 * | 8/2004 | Eyal .............................. | 707/3 |

* cited by examiner

Primary Examiner—Peling A Shaw

(57) ABSTRACT

A method and apparatus which efficiently searches for desired content from active multimedia data streams under the constraints that the data describing the content is not available until the transmission of the described content segment commences. A receiver computer sequentially scans a list of server I/O ports where content description data is available during the multimedia content data transmission from an I/O port on the same or alternative streaming multimedia server. The content description data provides a real time, but not advanced, description of the multimedia data available in a continuous multimedia data stream. The content description data for each of the scanned multimedia streams is presented to the user for manual selection. The user may optionally enter content preferences into a receiver computer database, which the receiver computer then uses to compare and connect to content which matches the user preferences. Seek: the receiver computer switches to a multimedia stream transmitting content with a desired content parameter. Skip: the receiver computer switches away from a current multimedia data stream which is transmitting content with a parameter which the user wants to avoid, to an alternate stream transmitting more preferable content.

16 Claims, 2 Drawing Sheets

METHOD AND APPARATUS FOR EFFICIENTLY SEARCHING AND SELECTING PREFERRED CONTENT FROM A PLURALITY OF ACTIVE MULTIMEDIA STREAMS

CROSS-REFERENCE TO RELATED APPLICATIONS

This application claims the benefit of provisional patent application Ser. No. 60/753,021, filed 2005 Dec. 22 by the present inventors.

FEDERALLY SPONSORED RESEARCH

Not Applicable

SEQUENCE LISTING OR PROGRAM

Not Applicable

BACKGROUND

1. Field of Invention

The present invention relates to computer related information search and retrieval, and specifically to streaming media search tools and methods.

2. Prior Art

Searching for content in actively streaming multimedia data streams, such as digital audio or video streams, is becoming increasingly difficult due to both technical and legal trends. While the computers receiving these multimedia streams have benefited from recent improvements in available network bandwidth, the demand for higher quality streams has in parallel raised the bandwidth requirements consumed by each stream connection. In addition, recent US copyright law changes prohibit the early availability of stream content information, or metadata, prior to the content segment transmission, rendering existing search approaches ineffective and costly.

Many multimedia data stream formats, such as the Shoutcast, Icecast, and Windows Media streaming formats, include provisions for periodically transmitting metadata information embedded in the stream itself by interleaving the metadata with the audio or video data. When a receiver computer connects to a stream, the receiver computer is able to decode the metadata, when it is inserted into the multimedia data stream, to display the content metadata, for example artist and title, to the receiver computer user.

Recent changes to the United States (US) Copyright Act restrict broadcasters of digital audio recording type multimedia streams from transmitting individual recording or track title and artist metadata prior to the start of the broadcast. For example, the title and artist information for a song track may not be made available by the broadcaster prior to time where the track audio data is transmitted in the continuous multimedia stream. This constraint on streaming multimedia broadcasts renders existing multimedia search techniques ineffective in finding desired content quickly enough for a user to hear or see the majority of a streaming multimedia selection. These prior search methods are particularly ineffective in the case of popular audio song tracks which average only three to four minutes in total duration. Other prior search techniques which rely upon advance information transmitted either within the multimedia stream or through a separate means, for example an electronic program guide are not possible for broadcasters who must abide by the new US Copyright Act provisions.

Another category of conventional multimedia search techniques is labeled as useful for streaming multimedia, but these techniques are designed for on-demand streaming of archived multimedia files, where the user does not experience the content until the search has been completed and the user or the user's computer signals to the host computer to commence streaming the desired multimedia content.

Users who wish to selectively enjoy specific live multimedia content from the wide range of sites abiding by the new US copyright laws described above, often manually connect to a multimedia stream server and wait for their receiver computer to decode the content metadata, which is displayed to the user, who then decides whether to continue to receive this stream or to connect to a different stream. Since the metadata is only periodically interleaved with the audio data in the streams, sometimes only at the beginning of a track, the delay between stream connection and metadata display can be up to several minutes. This current approach also consumes one of the limited number of streaming server connections for each alternative station which a user would like to monitor for preferred content, thereby possibly blocking another potential user who desires to connect to one of the monitored multimedia stream sources. This approach also requires the broadcaster to invest in increased streaming server capacity and bandwidth to support the additional parallel stream connections required by this search method. In addition, stream connections to acquire metadata, even if brief, may have sufficient duration to be deemed a performance under US copyright Act, which increases the broadcaster's royalty obligation. The current definition of performance for calculation of broadcaster royalty is each instance in which any portion of a sound recording is transmitted to a listener.

SUMMARY

The present invention provides a means of more efficiently monitoring and selecting desired streaming multimedia content by utilizing a novel method and apparatus which enables monitoring the content available from a plurality of active streams without actually initiating a connection to each of the scanned multimedia streams. The described method thereby enables a receiver computer user to search and select content from a plurality of multimedia streams content without requiring increased server stream I/O capacity, without increasing performance-based royalty payments by the stream broadcasters, and with much lower overall network loading.

DRAWINGS

Figures

DRAWINGS

Reference Numerals

10 Receiver Computer
12 Search and Selection Method Software Module
14 Multimedia Stream Decoding Module
16 Server Computers
18 Multimedia Data Streams
20 Content Metadata
22 Internet
24 Content Preference Database
26 Stream I/O Port
28 Interleaved Content Metadata
30 HTTP I/O Port
32 Database of Server Port Addresses
34 Scan List
36 Network Connection
38 Speaker
40 Headphone Jack
42 Display

DETAILED DESCRIPTION

Figure 1:
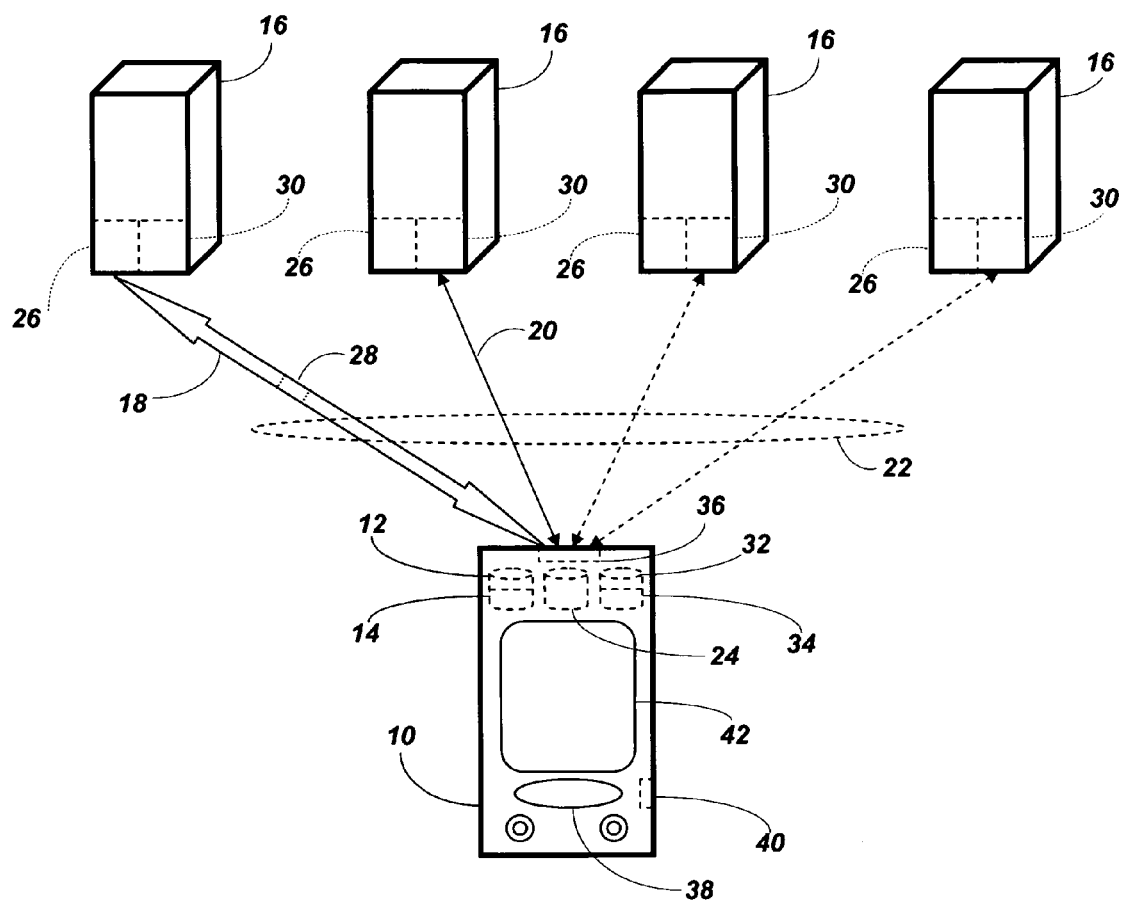
FIG. 1 shows a system diagram of server computers streaming multimedia content through a network to a receiver computer.

FIG. 1 shows a system diagram of a receiver computer 10 executing one embodiment of the described search and selection method software module 12, software or hardware-based multimedia stream decoding module 14, and a plurality of server computers 16 which are actively transmitting multimedia data streams 18 through the Internet 22 or related communication medium. In one embodiment, the multimedia data streams 18 contain audio content such as musical audio recordings. In an alternative embodiment, the multimedia data streams 18 contain video content. In one embodiment, receiver computer 10 contains a database of the user's multimedia content preferences 24. Server computers 16 transmit their multimedia data streams 18 through one or more stream I/O ports 26. The multimedia data streams 18 may contain content information embedded in the multimedia streams in the form of interleaved content metadata 28.

In one embodiment, the streaming server computers 16 list the current stream content metadata 20 in HyperText Markup Language (HTML) format, or equivalent text oriented format, such as Extensible Markup Language (XML), which is available on demand via standard HyperText Transfer Protocol (HTTP) requests to a separate HTTP input/output (I/O) port 30. In an alternative embodiment, a separate server 16 hosts current stream content metadata 20 for one or more separate servers 16 transmitting multimedia data streams 18. Receiver computer 10 also contains a database of server port addresses 32 for both the multimedia stream I/O ports and the HTTP I/O ports 30. Receiver computer 10 contains a subset of this multimedia stream address database, called a scan list 34 for use in the described search and selection method In one embodiment, receiver computer 10 connects to server computers 16 via a network connection 36 to the Internet. In this embodiment, network connection 36 utilizes Institute for Electrical and Electronics Engineers (IEEE) 802.11 standard wireless protocol. In alternative embodiments, receiver computer 10 is connected to the Internet 22 via alternative wireless connection technologies such as IEEE 802.16, or telecommunications standards such as Code Division Multiple Access (CDMA), Global System for Mobile Communications (GSM), General Packet Radio Service (GPRS), third generation (3G), or similar connection technologies. In an alternative embodiment, receiver computer 10 uses a hybrid communication approach where the multimedia stream I/O port 26 connections utilize one of the above communications technologies, and the HTTP I/O port 30 connections utilize a different communication technology. In another alternative embodiment, the connections between receiver computer 10 and server computers 16 are through a private network such as a private corporate intranet.

In one embodiment, receiver computer 10 is a handheld computer, such as a Personal Digital Assistant (PDA) connected directly to the Internet 22 through network connection 36. In an alternative embodiment, receiver computer 10 is connected to the Internet 22 via a serial connection such as Universal Serial Bus (USB), to a proxy computer, such as a desktop computer host. In another alternative embodiment, receiver computer 10 is a personal computer in either a desktop form factor or laptop form factor. In another alternative embodiment, receiver computer 10 is a multifunction phone, commonly known as a smartphone, which includes an application processing function used to execute the described search and selection method software module 12 and also includes either a hardware or software-based multimedia stream decoding module 14 which is capable of decoding multimedia data stream 18. In one embodiment, receiver computer 10 includes one or more speakers 38 for playback of audio multimedia streams and one or more headphone jacks 40 for attachment of audio headphones. In one embodiment, receiver computer 10 includes a display 42 for viewing video multimedia data stream 18 content.

Operation

Referring to FIG. 1, the user first enters multimedia content preference information into receiver computer 10. In one embodiment, content preference database 24 includes audio or video artist information. In one embodiment, content preference database 24 includes a list of artists to actively seek from among the artist in the currently playing multimedia data stream 18 or those artists playing on multimedia data streams 18 in the scan list 34, and a list of artists to avoid or skip from the currently playing multimedia data stream 18. In alternative embodiments, content preference database 24 includes one or more lists of preferred audio or video content attributes such as titles, genre types, year of content creation, quality level of stream content, encoding type of stream content, or even content origination parameters, such as live versus studio recordings.

In one embodiment, the user enters a list of port addresses for both multimedia data streams 18 and associated server computer HTTP I/O ports 30 into local database of server port addresses 32. In an alternative embodiment, the database of server port addresses 32 is loaded from a previously created file. The user may then group these stream addresses into one or more scan lists 34 based upon a number of criteria such as geographic location of the stream source, content type available in the stream, for example music genre, or other relevant grouping. In an alternative embodiment, scan list 34 is loaded from a previously created file.

Figure 2:
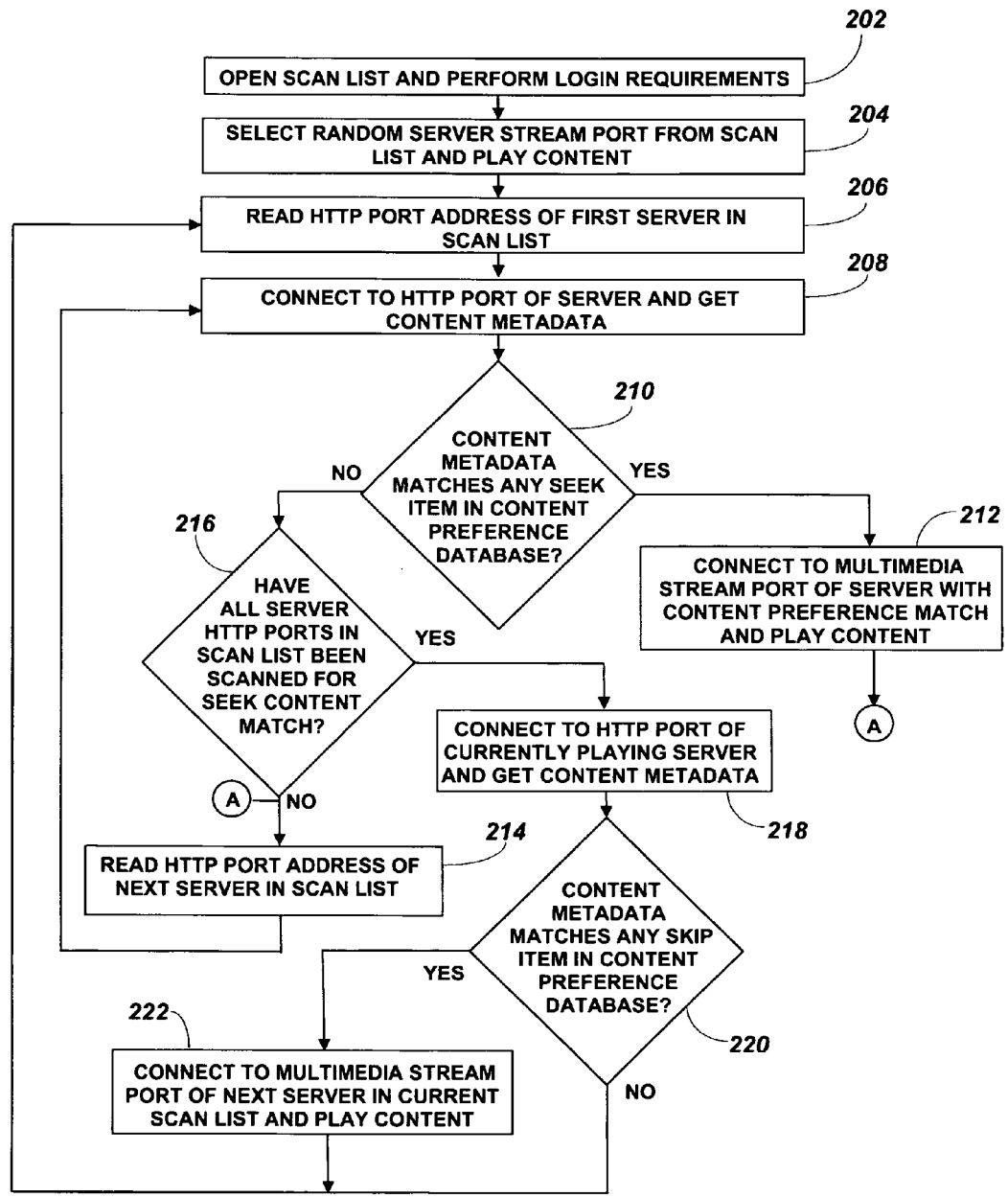
FIG. 2 shows a flowchart of a software program implementing one embodiment of the described novel search and selection method on the receiver computer.

FIG. 2 is a flowchart of a software program 200 which implements one embodiment of the described search and selection method on the receiver computer 10. Beginning with step 202, the receiver computer 10 opens the user-selected station scan list 34. In one embodiment, scan list 34 describes any login requirements for any of the stations which require a user login. Receiver computer 10 performs any login requirements, which may include access codes which must be appended to subsequent requests for content metadata 20 or multimedia data streams 18.

Receiver computer 10 then implements step 204, where it chooses server computer 16 at random from the list of server computers in scan list 34 and connects to stream I/O port 26 of the selected server computer 16. Receiver computer 10 begins playing multimedia data stream 18 so that the user can begin enjoying content in parallel with the remaining search steps. In one embodiment, multimedia data stream 18 is decoded for playback in steps 204, 212, and 222 on receiver computer 10 using separate multimedia stream decoding module 14. In the first embodiment, multimedia stream decoding module 14 utilizes software which configures receiver computer 10 to decode multimedia data streams 18. In alternative embodiments, multimedia stream decoding module 14 utilizes dedicated decoding hardware.

In step 206, receiver computer 10 begins the search portion of software module 12 by reading HTTP I/O port address 30 of the first server computer 16 in scan list 34. In step 208, receiver computer 10, connects to HTTP I/O port 30 of server computer 16 and retrieves content metadata 20 for multimedia data stream 18 which is currently being transmitted on server computer 16 stream I/O port 26.

Receiver computer 10 compares content metadata 20 to content preference database 24 in step 210. If the latest content metadata 20 matches at least one seek entry in content preference database 24, then receiver computer 10 performs step 212, where it connects to stream I/O port 26 of server computer 16 with the content match and begins playing the multimedia data stream 18 containing the preferred content. In an alternative embodiment, receiver computer 10 notifies the user of a content match and waits for an acknowledgement from the user before proceeding to step 212.

In an alternative embodiment, receiver computer 10 also temporarily removes the connected server computer 16 from scan list 34 for a short time period to improve both receiver computer 10 scan efficiency and to minimize requests to the server computer HTTP I/O port 30. In this alternative embodiment, the time period is calculated from the average expected duration the content segments, for example the average time of a song for audio multimedia data content.

Receiver computer 10 then proceeds to step 214, where it continues playing the multimedia data stream 18 while reading HTTP I/O port 30 address of the next server computer 16 in scan list 34.

Referring back to step 208, receiver computer 10 connects to HTTP port 30 of the next server 16 in scan list 34 and retrieves content metadata 20. In step 210, if server content metadata 20 does not match at least one seek entry in content preference database 24, receiver computer 10 executes step 216. In step 216, receiver computer 10 reviews the scan list 34 to determine if it has scanned all of the server HTTP I/O ports 30 for a match to the seek list of content preference database 24. If receiver computer 10 has scanned all server computers 16 in scan list 34 for a content match, then it performs step 218, where it connects to HTTP I/O port 30 of the currently playing server computer 16 and retrieves content metadata 20.

In step 220, receiver computer 10 compares content metadata 20 retrieved in step 218 to the skip entries in content preference database 24. If there is a match, receiver computer 10 proceeds to step 222. If there is not a match, then receiver computer 10 returns to step 206, where it begins the scan process again at the beginning of scan list 34.

In step 222, receiver computer 10 connects to multimedia stream I/O port 26 of the next server computer 16 in scan list 34 thereby skipping the remainder of the content segment identified in step 220. Receiver computer 10 then resumes scanning by returning to step 206.

It should be noted that there are many alternative embodiments which can each utilize the novel search and selection method and apparatus described in the present invention. For example, receiver computer 10 could execute novel search and selection method software module 12 without the use of content preference database 24 and simply display the results of the search for manual selection by the user. In another alternative embodiment, additional steps could be added to the search and selection method as receiver computers 10 become faster relative to the expected content duration. Alternative embodiments could also utilize non-sequential alternatives to progressing through the scan list during the search steps. Additional alternative embodiments could include cases where a single server HTTP I/O port 30 may transmit content information about a plurality of multimedia data streams 18, which would thereby reduce the number of steps required to implement the novel search and selection method described.

Advantages

Accordingly, the reader will see that at least one embodiment of the novel multimedia search and selection method and apparatus provides a more efficient means of searching and selecting preferred content from a plurality of active multimedia streams. It provides quicker scanning than either manual or automated methods which rely upon decoding the periodic interleaved content metadata 28, which is critical due to the new US copyright law restrictions which delay metadata availability until the start of the described content segment. It also prevents loading of the server computer 16 stream I/O ports 26 for acquisition of interleaved content metadata 28, thereby reducing server hardware investment and operator royalty charges. Finally, the described unique search and selection method and apparatus reduces the overall network bandwidth consumed by utilizing low bandwidth content metadata 20 retrieved via HTTP I/O ports 30 for content decisions rather than sequentially connecting to server multimedia data streams 18 and waiting for the periodic transmission of interleaved content metadata 28 from the high bandwidth stream.

It is to be understood that the embodiments of the invention which have been described are merely illustrative of a small number of applications of the principles of the invention. It is of course not possible to describe every conceivable permutation or combination of the present invention recognized by one of ordinary skill in the art. Accordingly the present invention is intended to embrace all such combinations, permutations and alterations that fall within the spirit of the appended claims.

We claim:

1. An apparatus for efficiently searching for desired content from a plurality of multimedia data stream broadcast transmissions comprising:
   a) a receiver computer capable of decoding multimedia data streams,
   b) a receiver computer memory capable of storing a scan list of server HTTP I/O port addresses where real-time content metadata is available,
   c) a software module capable of configuring said computer to implement said search method,
   d) a network connection on said receiver computer capable of communication to said server I/O ports,
   e) a server computers or a plurality of server computers capable of broadcasting multimedia data streams through I/O ports,
   f) a server computer or a plurality of server computers capable of transmitting real-time content metadata descriptions of said multimedia data stream through one or more HTTP I/O ports g) a receiver computer database capable of storing user content preferences whereby said software module will configure said receiver computer to initially direct said multimedia decoder of said receiver computer to connect to the I/O port of a random server entry in said scan list and begin playing said broadcast multimedia data stream and whereby said software module will then configure said receiver computer to communicate through said network connection to said server HTTP I/O port addresses in said scan list memory and retrieve said content metadata describing the current contents of said multimedia data stream broadcast transmissions which are presently available in parallel on said separate I/O ports of one or more of the said server computers transmitting said multimedia data stream broadcast transmissions and whereby said software module will compare said metadata with the user content preference[s] seek entries stored in said database and upon identification of a match will direct said multimedia decoder of said receiver computer to connect to the I/O port of said server broadcasting said matching multimedia data stream and play said content and whereby in the absence of a match said software module will repeat said metadata retrieval and comparison steps for each server HTTP I/O port address in said scan list memory and upon reaching the end of said scan list memory, said software module will connect to the HTTP I/O port of the currently playing server and retrieve and compare the content metadata with the user content preference skip entries stored in said user content preference database and upon identification of a match will direct said multimedia decoder of said receiver computer to disconnect from the currently playing multimedia data stream I/O port and connect to the multimedia data stream I/O port of the next server in said scan list and begin Playing said content and whereby said software module will repeat the said sequence by performing said content preference seek entry comparison steps for each server in said scan list memory followed by said content preference skip entry comparison steps for the currently playing multimedia data stream broadcast transmission.

2. The apparatus of claim 1, wherein said multimedia data stream broadcast transmissions contain video content.

3. The apparatus of claim 1, wherein said multimedia data stream broadcast transmissions contain audio content.

4. The apparatus of claim 1, wherein said receiver computer is a device purposed for the reception and playback of streaming multimedia data.

5. The apparatus of claim 1, wherein said receiver computer is a smartphone.

6. The apparatus of claim 1, wherein said receiver computer is a personal computer.

7. The apparatus of claim 1, wherein said scan list is created by said receiver computer user input.

8. The apparatus of claim 1, wherein said scan list is loaded into said receiver computer memory from a previously created file.

9. A method of efficiently searching for preferred content from a plurality of multimedia data stream broadcast transmissions comprising:

a) providing a receiver computer of the type capable of decoding multimedia data streams, b) providing receiver computer memory capable of storing a scan list of server HTTP I/O port addresses where real-time content metadata is available, c) providing a software module capable of configuring said receiver computer to implement said search method, d) providing a network connection on said receiver computer capable of communication to said server I/O ports, e) providing a server computer or a plurality of server computers broadcasting multimedia data streams through I/O ports, f) providing a server computer or a plurality of server computers capable of transmitting real-time content metadata descriptions of said multimedia data stream broadcast transmissions through one or more HTTP I/O ports, g) providing a receiver computer database capable of storing user content preferences, whereby said software module will configure said receiver computer to initially direct said multimedia decoder of said receiver computer to connect to the I/O port of a random server entry in said scan list and begin playing said broadcast multimedia data stream and whereby said software module with then configure said receiver computer to communicate through said network connection to said server HTTP I/O port addresses in said scan list memory and retrieve said content metadata describing the current contents of said multimedia data stream broadcast transmissions which are presently available in parallel on said separate I/O ports of one or more of the said server computers transmitting said multimedia data stream broadcast transmissions and whereby said software module will compare said metadata with the user content preference[s] seek entries stored in said database and upon identification of a match will direct said multimedia decoder of said receiver computer to connect to the I/O port of said server broadcasting said matching multimedia data stream and play said content and whereby in the absence of a match said software module will repeat said metadata retrieval and comparison steps for each server HTTP I/O port address in said scan list memory and upon reaching the end of said scan list memory, said software module will connect to the HTTP I/O port of the currently playing server and retrieve and compare the content metadata with the user content preference skip entries stored in said user content preference database and upon identification of a match will direct said multimedia decoder of said receiver computer to disconnect from the currently playing multimedia data stream I/O port and connect to the multimedia data stream I/O port of the next server in said scan list and begin playing said content and whereby said software module will repeat the said sequence by performing said content preference seek entry comparison steps for each server in said scan list memory followed by said content preference skip entry comparison steps for the currently playing multimedia data stream broadcast transmission.

10. The method of claim 9, wherein said content multimedia data stream broadcast transmissions contain video content.

11. The method of claim 9, wherein said content multimedia data stream broadcast transmissions contain audio content.

12. The method of claim 9, wherein said receiver computer is a device purposed for the reception and playback of streaming multimedia data.

13. The method of claim 9, wherein said receiver computer of the form known as a smartphone.

14. The method of claim 9, wherein said receiver computer of the form known as a personal computer.

15. The method of claim 9, wherein said scan list is created by said receiver computer user input.

16. The method of claim 9, wherein said scan list is loaded into said receiver computer memory from a previously created file.

* * * * *